(12) United States Patent
Mathai et al.

(10) Patent No.: US 11,112,574 B1
(45) Date of Patent: Sep. 7, 2021

(54) OPTOELECTRONIC SYSTEM WITH A WEDGE-SHAPED ADAPTER

(71) Applicant: Hewlett Packard Enterprise Development LP, Houston, TX (US)

(72) Inventors: Sagi Varghese Mathai, Sunnyvale, CA (US); Paul Kessler Rosenberg, Sunnyvale, CA (US); Georgios Panotopoulos, Berkeley, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/862,979

(22) Filed: Apr. 30, 2020

(51) Int. Cl.
*G02B 6/42* (2006.01)
*G02B 6/38* (2006.01)
*G02B 6/35* (2006.01)

(52) U.S. Cl.
CPC .......... *G02B 6/4292* (2013.01); *G02B 6/351* (2013.01); *G02B 6/389* (2013.01)

(58) Field of Classification Search
CPC combination set(s) only.
See application file for complete search history.

(56) References Cited

U.S. PATENT DOCUMENTS

| | | | |
|---|---|---|---|
| 4,732,451 A | 3/1988 | Furuta et al. | |
| 6,186,673 B1* | 2/2001 | Iida | G02B 6/4277 257/684 |
| 8,620,122 B2 | 12/2013 | Meadowcroft et al. | |
| 8,639,073 B2 | 1/2014 | Pelletier et al. | |
| 8,936,403 B2* | 1/2015 | Howard | G02B 6/4212 385/89 |
| 8,985,865 B2 | 3/2015 | Howard et al. | |
| 9,417,409 B2* | 8/2016 | Howard | G02B 6/3882 |
| 9,910,226 B2* | 3/2018 | Howard | G02B 6/4212 |
| 10,215,928 B2* | 2/2019 | Howard | G02B 6/3825 |
| 10,330,872 B2* | 6/2019 | Rosenberg | G02B 6/423 |
| 10,514,508 B2* | 12/2019 | Leigh | G02B 6/4214 |
| 10,895,688 B2* | 1/2021 | Leigh | G02B 6/4249 |
| 2010/0135618 A1* | 6/2010 | Howard | G02B 6/4214 385/79 |
| 2012/0063725 A1* | 3/2012 | Meadowcroft | G02B 6/3885 385/88 |
| 2013/0022316 A1* | 1/2013 | Pelletier | G02B 6/30 385/37 |
| 2013/0089293 A1* | 4/2013 | Howard | G02B 6/3882 385/79 |

(Continued)

*Primary Examiner* — Andrew Jordan
(74) *Attorney, Agent, or Firm* — Hewlett Packard Enterprise Patent Department

(57) ABSTRACT

Optoelectronic systems with an adapter and methods of manufacturing or assembling the same are provided. An example of an optoelectronic system according to the present disclosure includes a substrate, an interposer, an electronic component disposed on the interposer, and an optical component. The optoelectronic system includes a ferrule and an optical fiber coupled to the ferrule. The optoelectronic system also includes an optical socket configured to receive the ferrule therein. The optoelectronic system further includes an adapter positioned between the interposer and the optical socket. The adapter has a wedge-shaped configuration such that the ferrule is disposed at a non-zero angle relative to the interposer when the ferrule is received in the optical socket and the optical socket is coupled to the adapter.

20 Claims, 4 Drawing Sheets

(56) References Cited

U.S. PATENT DOCUMENTS

| | | | |
|---|---|---|---|
| 2013/0336617 A1* | 12/2013 | Otte | G02B 6/4292 |
| | | | 385/77 |
| 2015/0131946 A1* | 5/2015 | Howard | G02B 6/4214 |
| | | | 385/89 |
| 2016/0231521 A1* | 8/2016 | Smith | G02B 6/32 |
| 2017/0003456 A1* | 1/2017 | Howard | G02B 6/4292 |
| 2017/0299825 A1* | 10/2017 | Furuya | G02B 6/3652 |
| 2018/0188455 A1* | 7/2018 | Howard | G02B 6/4214 |
| 2019/0331858 A1 | 10/2019 | Leigh et al. | |
| 2020/0088947 A1* | 3/2020 | Leigh | G02B 6/4249 |

\* cited by examiner

OPTOELECTRONIC SYSTEM WITH A WEDGE-SHAPED ADAPTER

STATEMENT OF GOVERNMENT RIGHTS

This invention was made with Government support under Prime Contract No. DE-AC52-07NA27344 awarded by the DOE. The Government has certain rights in this invention.

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Optoelectronic systems or devices such as photonic integrated circuits (PICs) having a plurality of electronic and optical components may be used to convert, transmit, or process the optical signals or electronic data. Optical signals may be carried, transmitted, or propagated from board to board, chip to chip, system to system, server to server, or device to device via various transmission media including one or more optical connectors.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1A:
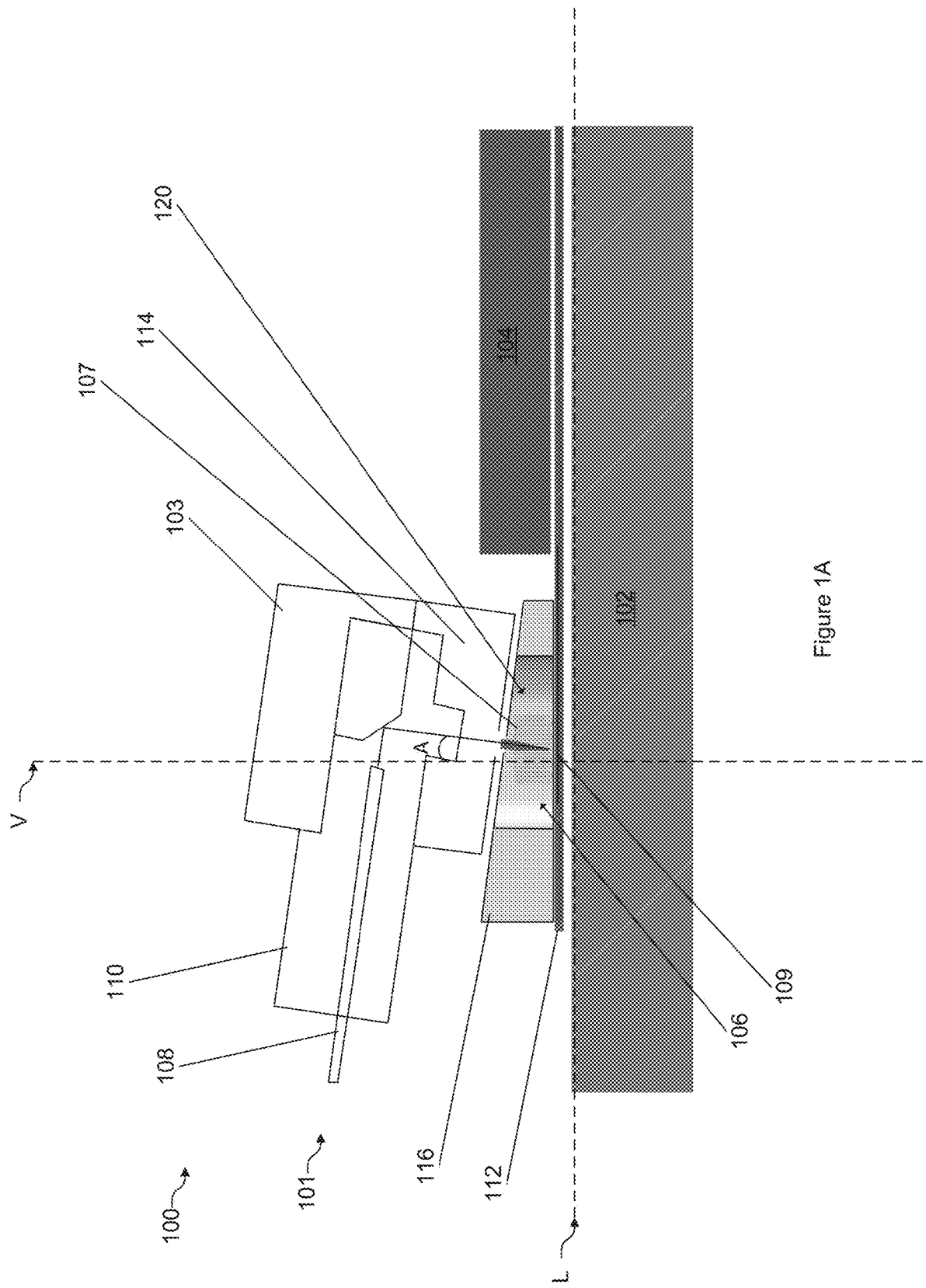
FIG. 1A illustrates a section view of an example of an optoelectronic system according to an implementation of the present disclosure.

Generally, an optoelectronic system or device includes one or more optical connectors to carry, transmit, or propagate optical signals on or off of the optoelectronic system (e.g., chip, substrate, package, die) or between chips on the same substrate. The optical connectors may require precisely molded parts or components to provide proper alignment (e.g., micron-level alignment or tolerance) between certain components of the optoelectronic system (e.g., an optical component and an optical ferrule).

An example of such a precise part is an optical socket configured to receive an optical ferrule, into which are assembled one or more optical fibers, which, in turn, are aligned with respect to an optical component (e.g., disposed on or within an optoelectronic substrate of an optoelectronic system). The optical socket is typically precisely aligned with the optical component and subsequently bonded to an optoelectronic substrate that may include or comprise one or more of an electronic printed circuit board (PCB) or other suitable circuit board (e.g., silicon, organic material), a substrate layer disposed over the circuit board, a silicon interposer, or a combination of an interposer bonded on top of a circuit board or substrate layer. More complex structures, consisting of multiple stacked layers of organic substrates and Si interposers, are also possible.

Generally, grating couplers disposed on or within the optoelectronic substrate are configured to couple light from a ferrule of an optical connector onto the optoelectronic substrate. The grating couplers are typically configured to accept tilted light beams (e.g., at 8 to 10 degrees relative to a vertical or normal axis) mode matched to a single mode optical fiber. A microlens array mounted in a solder reflowable receptacle can be used to efficiently couple the grating coupler to the ferrule (e.g., and the light beams from the optical fiber propagating therethrough). For example, a lens of the lens array to receive the light beam is laterally offset (e.g., light beam hits a region of the lens laterally offset from a central region) to both tilt and focus the light beam (e.g., a normal incidence expanded beam) from the ferrule toward the grating coupler on the optoelectronic substrate. In such configurations, the lens of the lens array is aspherical in order to avoid spherical aberration and has a diameter sufficiently large to prevent clipping.

In accordance with implementations of the present disclosure, a wedge-shaped adapter is positioned or disposed between the optoelectronic substrate (e.g., interposer) and the optical socket. The adapter and the optical socket are separately constructed components. The wedge-shaped configuration of the adapter tilts or disposes the optical socket and the ferrule received within the optical socket at a non-zero angle (e.g., an oblique angle) relative to a vertical or normal axis (e.g., an axis extending orthogonal to the optoelectronic substrate) when the ferrule is received in the optical socket and the optical socket is coupled to the adapter. By angling or tilting the optical socket and the ferrule, the optical fiber and light beam propagating therethrough are tilted to an appropriate angle (e.g., 8 to 10 degrees) to be coupled or accepted by a grating coupler thereunder.

The wedge-shaped adapter tilts the optical socket and the ferrule to ensure the appropriate angle of tilt of the light beam in contrast to a lens array as discussed above. An angle of the wedge-shaped adapter can be selected based on the angle of tilt required or desired of the light beam such that efficient coupling to the grating coupler is achieved. By tilting the ferrule and the light beam with a wedge-shaped adapter as described herein, a lens array design or configuration can be simplified. For example, an expanded light beam exits the ferrule, hits a central region of a lens of the lens array, and continues along a same optical axis to the grating coupler. The lens of the lens array merely focuses the expanded light beam onto the grating coupler and without tilting or intentionally deflecting the expanded light beam. In this manner, the lens configuration or design can be simplified (e.g., a spherical lens) as opposed to an aspherical-shaped lens configured to both tilt and focus the light beam. Additionally, because the expanded beam hits the central region of the lens, its aberrations, diameter, and sag can be lower relative to a laterally-offset lens. This can result in improved coupling efficiency, higher yield, and lower cost.

As described herein, the wedge-shaped adapter can be bonded to the substrate (e.g., substrate layer or the circuit board), to an interposer mounted on top of the substrate, or both the substrate and the interposer. The alignment of the wedge-shaped adapter to optical components may be relatively imprecise compared to the alignment accuracy required of the optical socket. In some implementations when the wedge-shaped adapter is configured to be bonded or otherwise mounted to the substrate, it may be necessary for the wedge-shaped adapter to straddle the interposer bonded on top of the substrate or circuit board (e.g., on two, three, or four sides of the interposer). In such implementations, the wedge-shaped adapter can be coupled to the substrate without contacting or otherwise being mechanically coupled to the interposer. In other implementations, the wedge-shaped adapter can be coupled directly to the interposer without contacting or otherwise being mechanically coupled to the substrate thereunder. In yet other implementations, the wedge-shaped adapter can be bonded or otherwise mounted directly to both the interposer and substrate thereunder.

Bonding the wedge-shaped adapter solely to the circuit board or substrate as opposed to the interposer mounted on the substrate as described herein transfers the attachment strength to the circuit board or substrate underlying the interposer. The wedge-shaped adapter can even be solder reflow attached to the substrate or circuit board, providing an extremely robust mechanical attachment. Attaching the wedge-shaped adapter solely to the interposer may produce undesirable results due to mechanical stress. Additionally, mechanical bond strength between the wedge-shaped adapter and the substrate can be increased by utilizing additional area on the substrate or circuit board for attachment to the adapter which may not be available on the interposer (e.g., generally much smaller than the substrate). This may be especially important when mechanical forces (e.g., strain) are applied to an optical cable that exits the ferrule or optical socket which can negatively affect the bond as commonly occurs in this context.

However, it should also be noted that in certain implementations as described herein, the adapter is bonded directly to an interposer mounted on the substrate, both the interposer and substrate, or to the substrate while only contacting the interposer to serve as a heat spreader or heat sink. For example, the wedge-shaped adapter may be formed of a highly thermally conductive filled material or entirely of the thermally conductive material (e.g., metal) to serve as a heat spreader or heatsink for the underlying interposer. In some implementations, the wedge-shaped adapter can include a solderable surface to be bonded to the interposer to provide a low thermally-resistant path between the wedge-shaped adapter and the interposer. When portions of the wedge-shaped adapter are directly contacting or bonded to the substrate or interfacing the substrate through a compliant thermal interface material, heat can be thermally conducted from the interposer to the wedge-shaped adapter and dissipated across the substrate.

As discussed above, strain caused by movement of the optical cable that exits the ferrule can negatively impact or affect the bond between the substrate or interposer and the wedge adapter which can lead to weakening or failure of the bond or ultimately damaging the interposer. In some implementations, the wedge-shaped adapter can be extended to provide strain relief for the optical fiber terminated at the ferrule. For example, increasing a size of the wedge-shaped adapter can distribute strain or force over a larger area. Additionally, the wedge-shaped adapter can be extended such that an end portion or surface is in contact with or supports the optical fiber, clip, or rear end of the ferrule to provide strain relief accordingly. For example, a portion of the wedge-shaped adapter can be secured (e.g., mechanically) to the optical fiber or rear end of the ferrule to provide strain relief. By providing such strain relief upon the ferrule, undesirable movement of the ferrule within the socket can be reduced or minimized. Such movements once the ferrule is coupled to the socket can reduce optical coupling efficiency between the ferrule and the grating coupled within the interposer configured to receive light from the optical fiber. Such strain relief can also reduce retention force necessary or required to retain or hold (e.g., secure) the ferrule in the optical socket.

Implementations of the present disclosure provide improved optoelectronic systems or methods of manufacturing or assembling the same. Such improved optoelectronic systems include a wedge-shaped adapter to tilt the optical socket and the ferrule to ensure the appropriate angle of tilt of the light beam to be coupled to a grating coupler thereunder. By using such a wedge-shaped adapter, a lens configuration or design can be simplified. This can result in lower aberrations, diameter, and sag as well as improved coupling efficiency, higher yield, and lower cost. In certain implementations, the wedge-shaped adapter can also provide heat sink or strain relief capability as well.

Figure 1B:
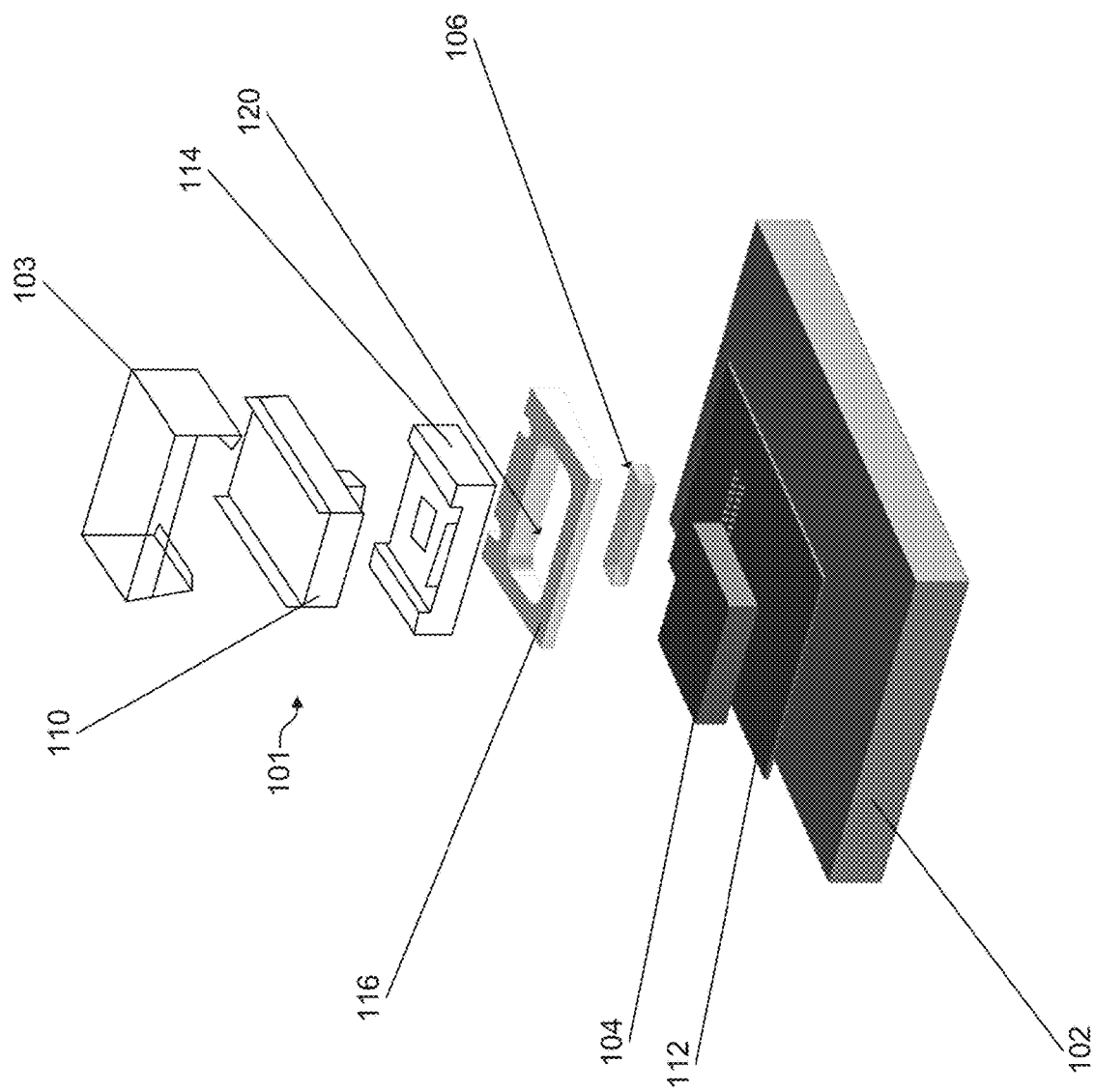
FIG. 1B illustrates an exploded view of the optoelectronic system of FIG. 1A with the optical fiber removed for clarity.

FIGS. 1A-1B illustrate an example of an optoelectronic device or system 100 according to the present disclosure. The optoelectronic system 100 includes a substrate 102 (e.g., an organic substrate layer), an interposer 112 disposed on the substrate 102, an electronic component 104 disposed on the interposer 112, and an optical component 106. The optoelectronic system 100 includes an optical connector 101 having a ferrule 110 and an optical fiber 108 coupled to the ferrule 110. The optical connector 101 also includes an optical socket 114 configured to receive the ferrule 110 therein. The optical socket 114 is configured to align the ferrule 110 and the optical component 106 when the ferrule 110 is received therein and the optical socket 114 is coupled to the interposer 112 or the substrate 102. In some implementations, the optical connector 101 includes a clip 103 to secure the ferrule 110 to the optical socket 114.

While illustrated as securing the ferrule 110 to the optical socket 114 by latching on or otherwise holding the optical socket 114, in other implementations, the clip 103 can secure the ferrule 110 to the optical socket 114 by latching on or holding the adapter 116 described below. The adapter 116 is positioned below the optical socket 114 and the clip 103 can extend past the socket 114 to secure the adapter 116 thereto. By latching onto the adapter 116, the ferrule 110 can be secured to the optical socket 114 without the clip 103 latching directly onto the optical socket 114. In yet other implementations, two or more separate clips 103 can be utilized. For example, a first clip can latch on to the optical socket 114 and a second (e.g., oversized or larger) clip can extend past the optical socket 114 and first clip to latch onto the adapter 116. The first and second clips together securing the optical socket 114 and the ferrule 110.

The optoelectronic system 100 further includes an adapter 116 positioned between the interposer 112 and the optical socket 114. The adapter 116 and the optical socket 114 are separately constructed or formed components. The adapter 116 has a wedge-shaped configuration such that the ferrule 110 is disposed at a non-zero angle relative to the interposer 112 when the ferrule 110 is received in the optical socket 114 and the optical socket 114 is coupled to the adapter 116. In some embodiments, the wedge-shaped adapter 116 may be injection molded as part of the design of the socket 114, or insert molded with the socket 114.

As described herein, the substrate 102 may include a substrate layer disposed over a circuit board. The substrate 102 may serve as a foundation or common carrier for electronic and optical components mounted or otherwise disposed on the interposer 112 (e.g., a silicon photonic interposer or other type of optical or electro-optical interposer). For example, one or more electronic components 104 (e.g., an ASIC) and one or more optical components 106 (e.g., a lens array 107, grating coupler 109) can be disposed on or within the interposer 112, The optoelectronic system 100 may incorporate elements such as waveguides, electro-optical modulators, photodetectors, light sources, or other electro-optical components used to convert an electrical signal to a light signal or vice versa.

While not specifically illustrated in FIGS. 1A-1B, the interposer 112 may include multiple layers (e.g., conducting, semiconductor, dielectric, or insulating layers). For example, the interposer 112 may include an insulating layer sandwiched between semiconductor layers. The interposer 112 may be a silicon-on-insulator (SOI) or a silicon-on-glass substrate. In some implementations, the interposer 112 includes an insulating layer such as a buried oxide (BOX) layer composed of silicon dioxide or other insulating oxide material. In yet other implementations, the insulating layer is composed of another insulating material such as sapphire, diamond, or glass.

The one or more electronic components 104 are in electrical communication with electro-optical components (e.g., incorporated in or on the interposer 112 or the substrate 102 as described in more detail below), which in the transmission mode; transform electrical signals into optical signals which are transmitted through the one or more optical components 106 such as the grating coupler 109 coupled to the lens array 107 and into a ferrule (e.g., the ferrule 110). When operating in a receive mode, optical signals are transmitted from the ferrule, on an optical socket (e.g., the optical socket 114), into the lens array 107 where the signals are focused onto a grating coupler 109 coupled to the electro-optical components embedded in the interposer beneath the lens array, converted into electronic signals, and ultimately transferred to the electronic component 104 (e.g., for processing).

The optoelectronic system 100 may include the interposer 112 to connect or couple (e.g., optically or both electrically and optically) the one or more electronic and optical components. The one or more electronic components 104 may include, but are not limited to, integrated circuits, processors, chip sets, circuit boards, or combinations thereof. The one or more optical components 106 may include, for example, single lenses, lens arrays, fiber stubs, or optical tapers (e.g., configured to focus optical signals from a light beam onto a grating coupler thereunder). Electro-optical components integrated into the interposer 112 or substrate 102 may include, but are not limited to, light emitters, light detectors, photodetectors, lasers, waveguides, modulators, heaters, filters, microring resonators and combinations thereof.

In some implementations, the lens or lens array 107 is configured to collect, collimate, focus, or concentrate optical signals prior to passing the optical signals from the light emitter, to the light detector, or to/from the optical transceiver or an optical fiber optically coupled to the lens or lens array (e.g., via the ferrule 110 and optical socket 114). Vertical cavity surface emitting lasers, light emitting diodes, distributed feedback semiconductor laser diodes, or miniature lasers are examples of commonly used light emitters or sources. Surface illuminated photodiodes, waveguide photodetectors, or phototransistors are examples of commonly used light detectors.

As discussed above, the optical fiber 108 is coupled (e.g., opto-mechanically) to the ferrule 110. A first end of the optical fiber 108 may terminate within or otherwise be coupled or bonded to the ferrule 110. In some implementations, a second end of the optical fiber 108 may be coupled to a light emitter, light detector, or optical transceiver (not shown in FIGS. 1A-1B) disposed off of or away from the substrate 102. The optical fiber 108 may carry or transmit optical signals to or from the optical component 106 (e.g., as a light beam onto or off of the optoelectronic system 100). The optical fiber 108 may be a single fiber or an array of fibers. The optical fiber 108 may be a single mode, polarization maintaining, or multi-mode optical fiber.

The optical socket 114 is configured (e.g., shaped or dimensioned) to receive and hold the ferrule 110 therein. The optical socket 114 aligns the ferrule 110 and the optical component 106 when the ferrule 110 is received (e.g., positioned, disposed, inserted) therein and the optical socket 114 is mounted on or to the substrate 102 or interposer 112 via the adapter 116. For example, a light beam from the optical fiber 108 exiting the ferrule 110 propagates along an optical axis and hits a central region of a lens of the lens array 107. The lens of the lens array 107 merely focuses the light beam onto the grating coupler 109 without tilting or intentionally deflecting the light beam such that the light beam continues along the same optical axis of the grating coupler 109. Optical signals from the light beam can then be converted to electrical signals for further processing (e.g., via photodetectors on or within the interposer 112).

As described above, the optical socket 114 is fixedly mounted on or to the substrate 102 or interposer 112 via the adapter 116. The adapter 116 is disposed between the substrate 102 or interposer 112 and the optical socket 114 such that the optical socket 114 is spaced from the substrate 102 or interposer 112 by the adapter 116. The adapter 116 may be bonded (e.g., fixedly attached, assembled on, or otherwise physically coupled) to both the substrate 102 or interposer 112 and the optical socket 114 to support the optical socket 114 on the substrate 102 or interposer 112 in a fixed position. The adapter 116 may provide a base for the optical socket 114 to sit or be disposed on between the optical socket 114 and the substrate 102 or interposer 112.

The adapter 116 has a wedge-shaped configuration such that the ferrule 110 is disposed at a non-zero angle relative to the substrate 102 or interposer 112 when the ferrule 110 is received in the optical socket 114 and the optical socket 114 is coupled to the adapter 116. For example, the adapter 116 disposes the ferrule at an oblique angle relative to a vertical axis V extending perpendicular to a longitudinal axis L of the substrate 102 or interposer 112. As discussed above, by angling or tilting the optical socket 114 and the ferrule 110, the light beam from the optical fiber 108 propagating therethrough is tilted to an appropriate angle (e.g., angle A which can be 8 to 10 degrees) to be coupled or accepted by the grating coupler 109 thereunder. The wedge-shaped adapter 116 tilts the optical socket 114 and the ferrule 110 to ensure the appropriate angle of tilt of the light beam rather than a lens of the lens array 107 resulting in a simplified lens design or configuration. The lens of the lens array 107 merely focuses the expanded light beam onto the grating coupler 109 without tilting or intentionally deflecting the light beam.

As discussed above, the wedge-shaped adapter 116 can be bonded to the substrate 102 (e.g., substrate layer or the circuit board), to the interposer 112 mounted on top of the substrate 102, or both the substrate 102 and the interposer 112. In some implementations when the wedge-shaped adapter 116 is configured to be bonded or otherwise mounted to the substrate 102, the wedge-shaped adapter 116 straddles the interposer 112 (e.g., on two, three, or four sides of the interposer). In such implementations, the wedge-shaped adapter 116 can be coupled to the substrate 102 with or without contacting or otherwise being coupled to the interposer 112. In other implementations, the wedge-shaped adapter 116 can be coupled directly to the interposer 112 with or without contacting or otherwise being coupled to the substrate 102 thereunder. In yet other implementations, the wedge-shaped adapter can be bonded or otherwise mounted directly to both the interposer 112 and substrate 102.

Bonding the wedge-shaped adapter 116 solely to the substrate 102 as opposed to the interposer 112 transfers the attachment strength to the substrate 102. The wedge-shaped adapter 116 can be solder reflow attached to the substrate 102 (e.g., providing an extremely robust mechanical attachment). While in other implementations, the adapter 116 can be adhered to the substrate 102 with an adhesive (e.g., curable adhesive or epoxy). Attaching the wedge-shaped adapter 116 directly or solely to the interposer 112 may produce undesirable results due to mechanical stress or induced electrical effects in certain implementations. Additionally, mechanical bond strength between the wedge-shaped adapter 116 and the substrate 102 can be increased by utilizing additional surface area on the substrate 102 for attachment to the adapter 116 which may not be available on the interposer 112 (e.g., generally much smaller than the substrate). This may be especially important when mechanical forces (e.g., strain) are applied to the optical fiber 108 that exits the ferrule 110 or optical socket 114 which can negatively affect the bond or alignment as can commonly occurs in this context. As described in more detail below, the adapter 116 can be configured to provide additional strain relief.

However, it should also be noted that in certain implementations as described herein, the adapter 116 can be bonded directly to the interposer 112, both the interposer 112 and substrate 102, or to the substrate 102 while only contacting the interposer 112 in order to serve as a heat spreader or heat sink for the interposer 112. For example, the wedge-shaped adapter 116 may be formed of a highly thermally conductive filled material or entirely of the thermally conductive material (e.g., metal) to serve as a heat spreader or heatsink for the underlying interposer 112. In some implementations, the wedge-shaped adapter can further include fins or be integrated with fins to provide additional surface area for more efficient heat transfer. In some implementations, the wedge-shaped adapter 116 can include a solderable surface to be bonded to the interposer 112 to provide a low thermally-resistant path between the wedge-shaped adapter 116 and the interposer 112. When portions of the wedge-shaped adapter 116 are also contacting or bonded to the substrate 102, heat can be thermally conducted from the interposer 112 to the wedge-shaped adapter 116 and dissipated across the substrate 102. In other implementations, when the wedge-shaped adapter 116 is coupled to the interposer 112, without contacting or being bonded to the substrate 102, heat can be thermally conducted from the interposer 112 to the socket 114 or ferrule 110 via the adapter 116.

As discussed above, strain caused by movement of the optical fiber 108 that exits the ferrule 110 can negatively impact or affect a bond between the substrate 102 or interposer 112 and the wedge adapter 116 which can lead to weakening or failure of the bond or ultimately damaging the interposer 112. This may also lead to changing lateral or angular positions of the ferrule 110 and potential misalignment relative the lens of lens array 107. In some implementations, a dimension (e.g., length) of the wedge-shaped adapter 116 can be extended to provide strain relief for the optical fiber 108 terminated at the ferrule 110. For example, increasing a size or surface area of the wedge-shaped adapter 116 can distribute strain or force over a larger area. Additionally, the wedge-shaped adapter 116 can be extended or designed such that an end portion or surface is in contact or supports the optical fiber 108 or rear end of the ferrule 110 to provide support and strain relief accordingly.

Figure 2A:
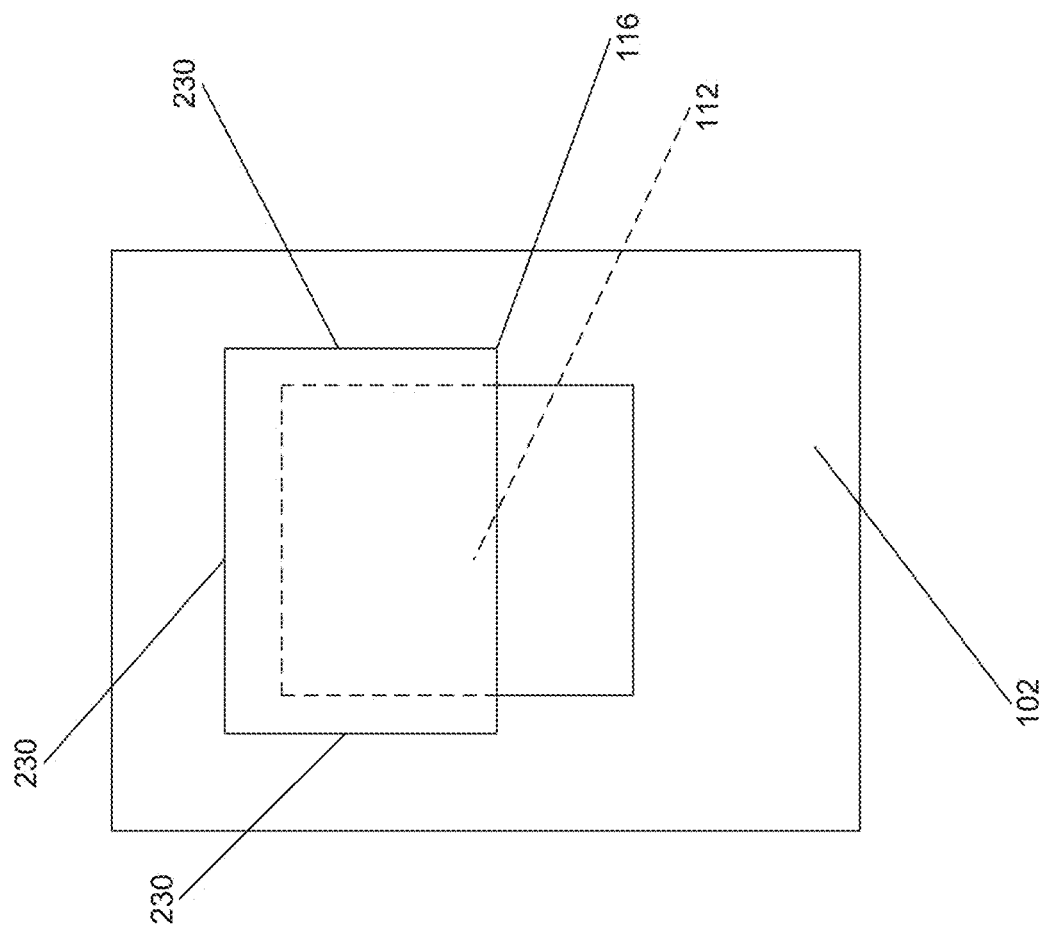
FIG. 2A illustrates a top view of the adapter, interposer, and substrate of the optoelectronic system of FIG. 1A with other components removed to avoid obscuring certain features of the optoelectronic system in accordance with another implementation of the present disclosure.
Figure 2B:
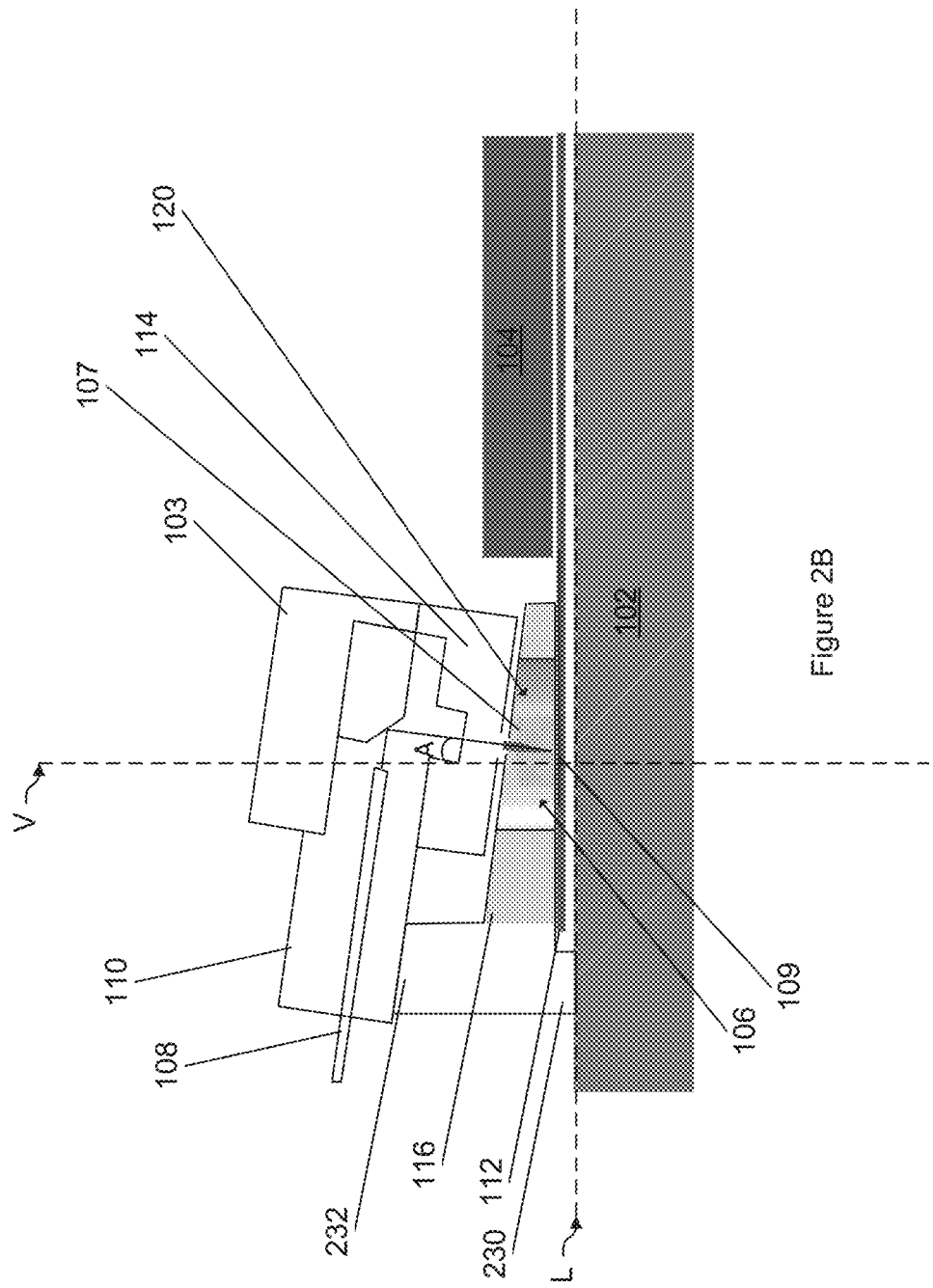
FIG. 2B illustrates a section view of the components of FIG. 2A showing additional features in accordance with another implementation of the present disclosure.

With reference to FIGS. 2A-2B, in some implementations, the wedge-shaped adapter 116 includes mounting portions 230 (e.g., feet) extending over or past sides of the interposer 112 and coupled to the substrate 102. While illustrated as extending or straddling three sides of the interposer 112, as described above, the adapter 116 can extend past or over two, three, or four sides of the interposer 112. As illustrated, the adapters includes mounting portions 230 straddling opposing lateral sides of the interposer 112 and a rear side of the interposer 112. As discussed above, the mounting portions 230 can be coupled to the substrate 102 or merely contacting the substrate while having other portions coupled to the interposer 112. In other implementations, both the mounting portions 230 and other portions of the adapter 116 can be coupled to both the interposer 112 and the substrate 102. In yet other implementations, the mounting portions 230 can be coupled to the substrate 102 with no portions of the adapter 116 contacting or coupled to the interposer 112. In such implementations, the mounting portions 230 support the adapter 116 such that it is spaced apart or above the interposer 112.

As discussed above, the adapter 116 can be configured to provide strain relief. As illustrated, a mounting portion 230 extends past a rear side of the interposer 112 to help stabilize and support the optical socket 114, ferrule 110, or the optical fiber 108. The adapter 116 can also include an end portion 232 extending upwardly to support a rear portion of the ferrule 110 thereupon when the ferrule 110 is assembled or coupled to the optical socket 114 disposed on the adapter 116. The end portion 232 can also support the optical fiber 108 and can be secured to the optical fiber 108, ferrule 110, clip 103, or two or more of the aforementioned components. In addition to providing strain relief, the end portion 232 can also serve as a dust cap to block dust or contaminates from entering the ferrule, socket, etc. (e.g., extending over a portion of the ferrule).

With reference back to FIGS. 1A-1B, the adapter 116 includes a through opening 120 to allow the light beam from the optical fiber 108 to pass therethrough to the optical component 106 when the optical device 100 is assembled. The opening 120 can be sealed with a thin anti-reflective (AR) coated glass window. In other implementations, the adapter 116 can be constructed with a solid window formed from transparent material incorporated in its design (e.g., completely or substantially filling the opening 120). In such implementations, the adapter 116 can be constructed out of a transparent material such as glass or plastic. Such thin-coated or solid windows can prevent or reduce the entry of contamination or debris into the optical path between the ferrule 110 and optical component 106 (e.g., the lens array 107), reduce reflection or ghost images, or increase transmission efficiency.

An example method of assembling an optoelectronic system as described herein can include one or more of the following steps. For example, the method can include providing the substrate 102 and the interposer 112 disposed on the substrate 102. The electronic component 104 (e.g., an ASIC) can be flip-chip assembled to the interposer 112. The optical component 106 (e.g., the lens array 107) can be also flip-chip assembled or otherwise solder-self-aligned to the interposer 112. The wedge-shaped adapter 116 can then be mounted to the interposer 112 or substrate 102 as described above. In some implementations, the optical socket 114 can be vision aligned to the lens array 107 and/or the interposer 112. The optical socket 114 can then be mounted or otherwise coupled to the wedge-shaped adapter 116. The ferrule 110 coupled to the optical fiber 108 can be inserted or positioned into the optical socket 114. In other implementations, a sub-assembly comprising the optical socket 114 and the ferrule 110 can be actively aligned with another sub-assembly comprising the lens array 107 and the interposer 112. The optical socket 114 can then be mounted or otherwise coupled to the wedge-shaped adapter 116. Methods of assembly herein can include additional, partial, or less steps than those discussed above as well as rearranging order of the steps.

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect, between two or more elements; the coupling or connection between the elements can be physical (e.g., mechanical), logical, electrical, optical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optoelectronic system comprising:
a substrate;
an interposer disposed on the substrate;
an electronic component disposed on the interposer;
an optical component;
a ferrule and an optical fiber coupled to the ferrule;
an optical socket configured to receive the ferrule therein, the optical socket configured to align the ferrule and the optical component when the ferrule is received therein and the optical socket is coupled to the interposer or the substrate;
an adapter positioned between the interposer and the optical socket, the adapter and the optical socket being separately constructed, the adapter having a wedge-shaped configuration such that the ferrule is disposed at a non-zero angle relative to the interposer when the ferrule is received in the optical socket and the optical socket is coupled to the adapter.

2. The optoelectronic system of claim 1, wherein the ferrule is disposed at an oblique angle relative to the interposer.

3. The optoelectronic system of claim 1, wherein the adapter is coupled to the interposer via an adhesive.

4. The optoelectronic system of claim 1, wherein the adapter is soldered to the interposer.

5. The optoelectronic system of claim 1, wherein the adapter is dimensioned to straddle opposing lateral sides of the interposer and is coupled to the substrate.

6. The optoelectronic system of claim 5, wherein the adapter is coupled to the substrate on at least three different sides of the interposer including the opposing lateral sides.

7. The optoelectronic system of claim 5, wherein the adapter includes a window configured to allow light from the optical fiber to pass therethrough to the interposer.

8. The optoelectronic system of claim 7, wherein the window is an opening extending through a portion of the adapter sealed with an anti-reflective coating.

9. The optoelectronic system of claim 7, wherein the adapter is constructed out of a transparent material and the window is a solid window monolithically formed within the adapter.

10. The optoelectronic system of claim 1, wherein the optical component comprises a spherical lens and wherein the optical socket aligns the ferrule and the spherical lens when the ferrule is received in the optical socket and the optical socket is coupled to the adapter such that light from the optical fiber impinges on a center region of the spherical lens.

11. The optoelectronic system of claim 1, wherein the adapter is constructed out of a thermally-conductive material.

12. The optoelectronic system of claim 1, wherein the adapter extends past a rear side of the interposer, the rear side extending perpendicular to opposing lateral sides of the interposer, the adapter extending under a rear end portion of the ferrule such that the adapter provides strain relief to the optical fiber coupled to the ferrule.

13. A method of assembling an optoelectronic system, the method comprising:
providing a substrate and an interposer disposed thereon, the interposer having an electronic component and an optical component disposed thereon or therein, the electronic component and optical component in one or both of electrical and optical communication with each other;
positioning a ferrule coupled to an optical fiber within an optical socket;
bonding a wedge-shaped adapter to the substrate; and
bonding the optical socket to the adapter, the adapter disposing the ferrule at a non-zero angle relative to an upper surface of the interposer.

14. The method of claim 13, wherein the adapter is bonded to both the substrate and the interposer.

15. The method of claim 13, wherein the adapter extends past three different sides of the interposer and is bonded to the substrate on the three different sides of the interposer.

16. The method of claim 13, wherein the adapter includes a portion extending upwardly in contact with and supporting a rear end portion of the ferrule, the portion of the adapter secured to one or more of the optical fiber or ferrule to provide strain relief.

17. An optoelectronic system comprising:
a substrate;
an interposer disposed on the substrate including an ASIC and a a lens array having at least one spherical lens;
a ferrule and an optical fiber having one end terminated within ferrule;

an optical socket configured to receive the ferrule therein, the optical socket configured to align the ferrule and the at least one spherical lens when the ferrule is received therein and the optical socket is coupled to the interposer and the substrate;

an adapter positioned between the interposer and the optical socket, the adapter and the optical socket being separately constructed, the adapter having a wedge-shaped configuration such that the ferrule is disposed at a non-zero angle relative to an upper surface of the interposer when the ferrule is received in the optical socket and the optical socket is coupled to the adapter, wherein light transmitted by the optical fiber is tilted at an oblique angle and is configured to impinge on a central region of the spherical lens after exiting the ferrule.

18. The optoelectronic system of claim 17, wherein the adapter includes mounting portions extending past two opposing lateral sides of the interposer and bonded to the substrate.

19. The optoelectronic system of claim 17, wherein the adapter includes one or more finned portions.

20. The optoelectronic system of claim 17, wherein the adapter includes a window portion extending through the adapter constructed out of transparent material to allow light from the optical fiber to be transmitted therethrough from the optical fiber to the interposer.

* * * * *